No. 790,519. PATENTED MAY 23, 1905.
J. MOLL & O. ZELLER.
APPARATUS FOR TURNING LOCOMOTIVE WHEELS AND THEIR ACCESSORIES
WHILE ASSEMBLED.
APPLICATION FILED JULY 12, 1902.
6 SHEETS—SHEET 1.
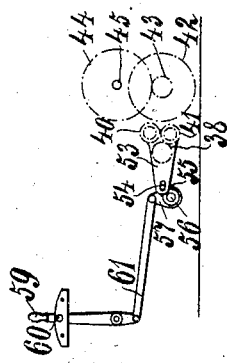
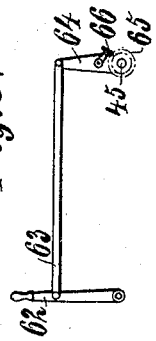
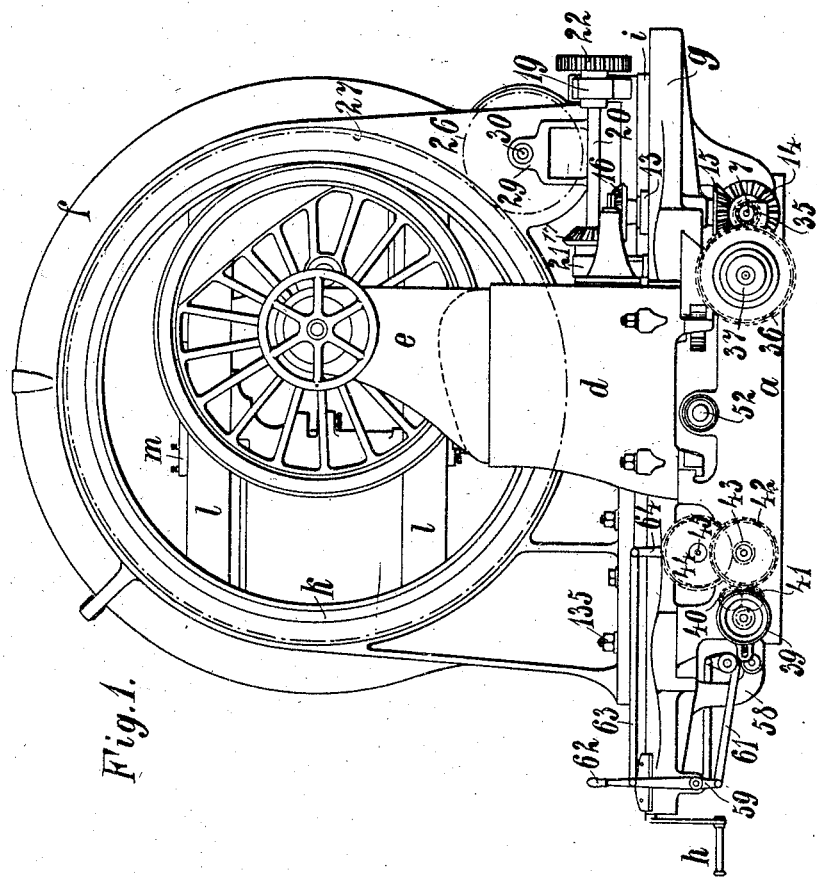
Witnesses
Inventors,
Johann Moll.
Otto Zeller.
By Knight Bros
Attys.

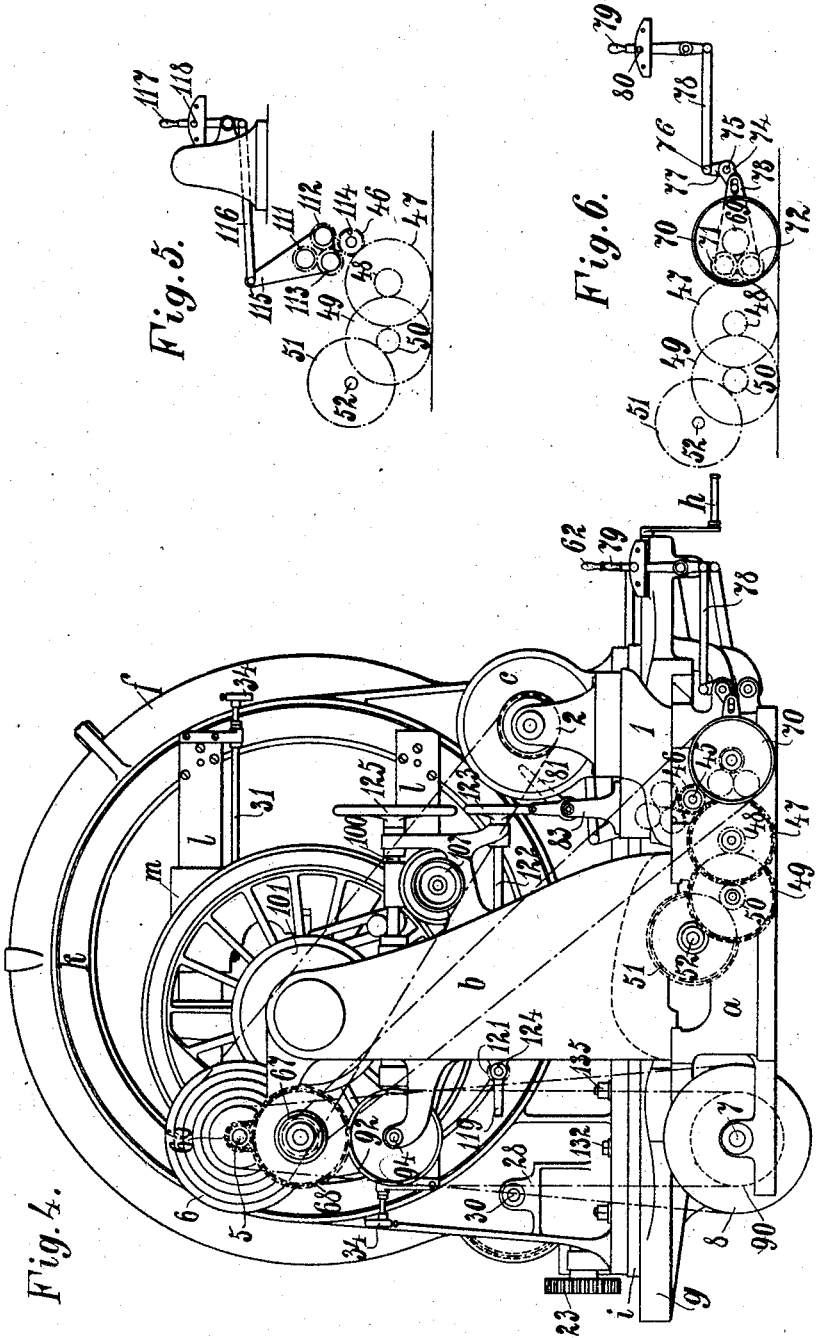

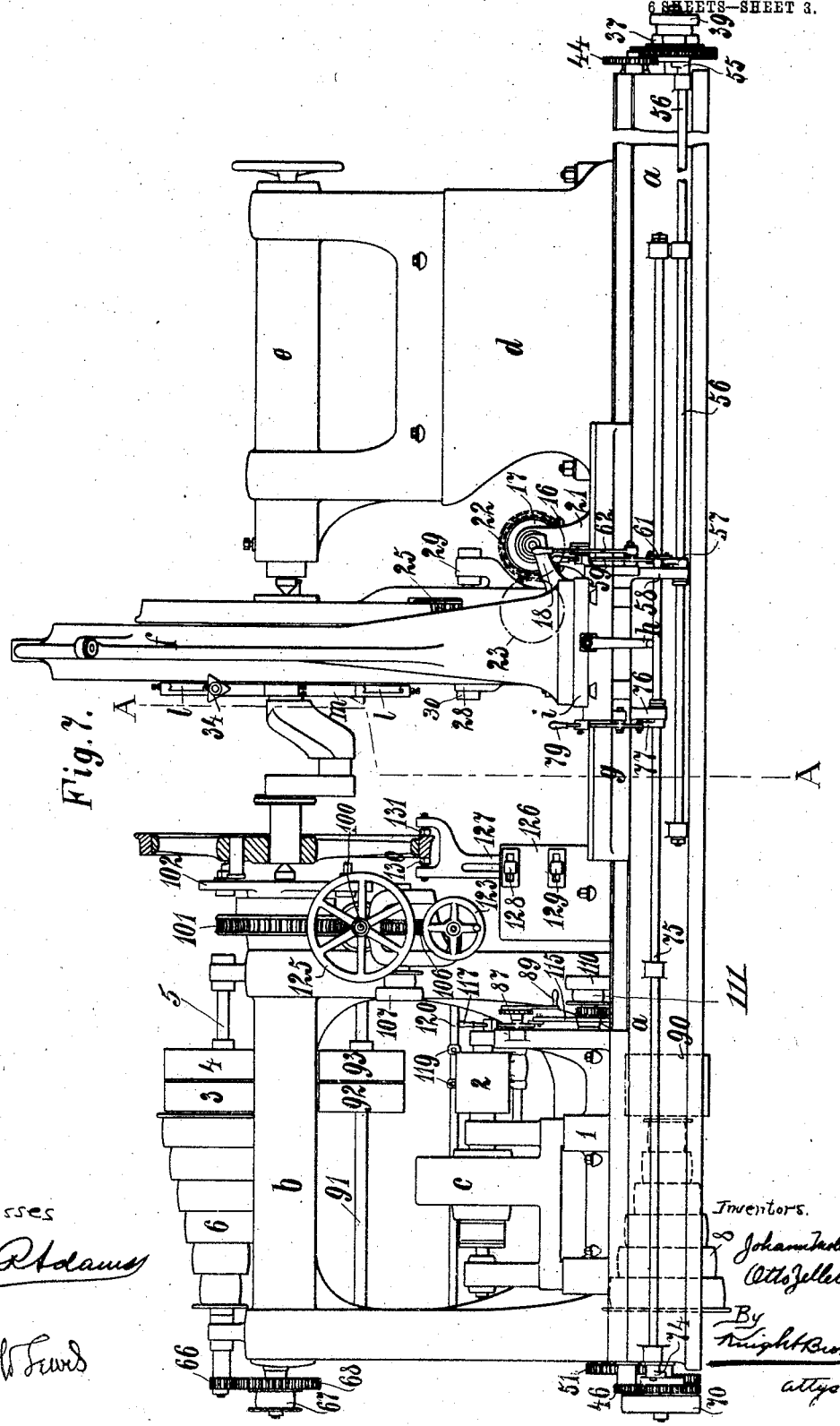

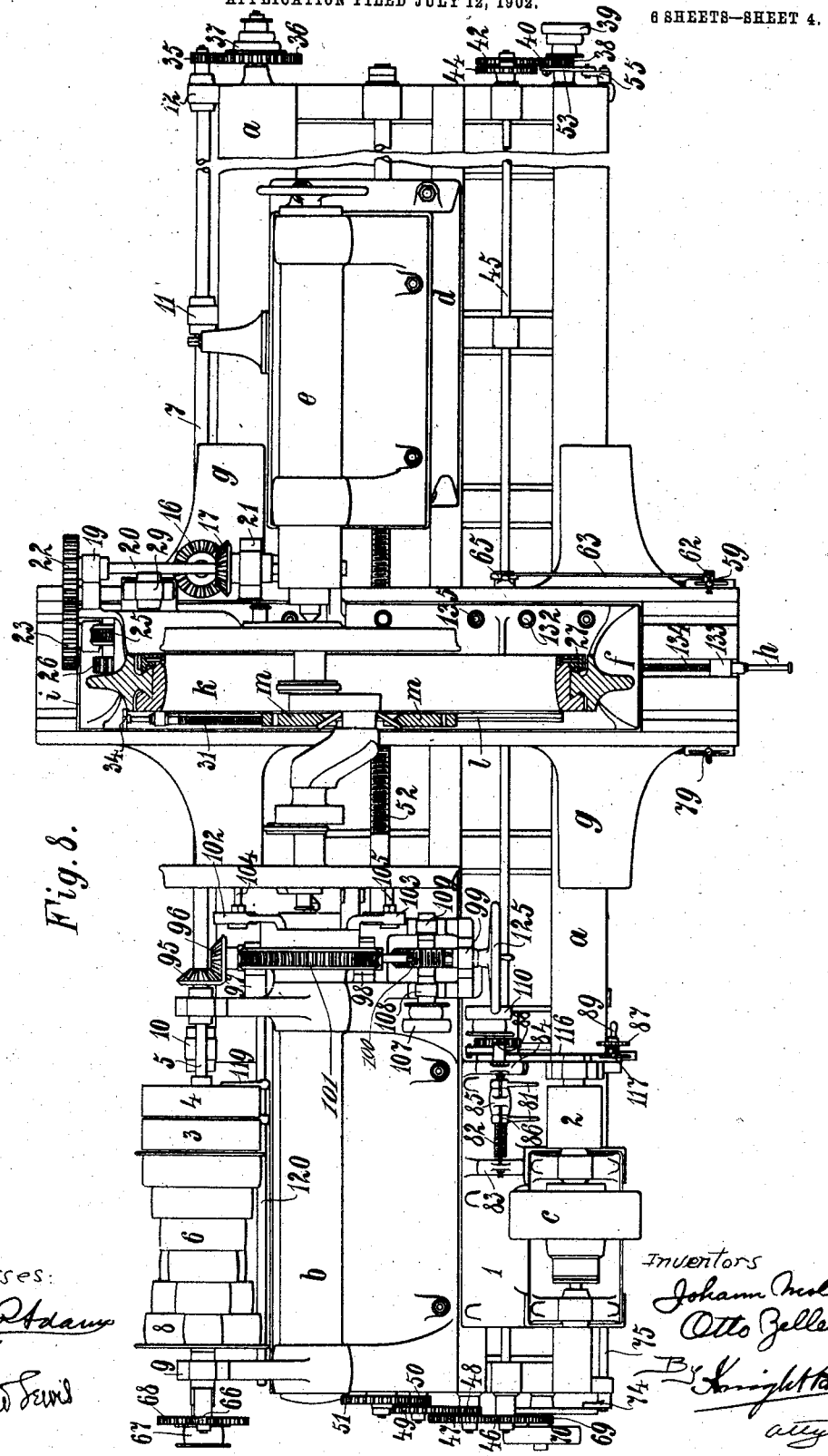

No. 790,519. PATENTED MAY 23, 1905.
J. MOLL & O. ZELLER.
APPARATUS FOR TURNING LOCOMOTIVE WHEELS AND THEIR ACCESSORIES
WHILE ASSEMBLED.
APPLICATION FILED JULY 12, 1902.

6 SHEETS—SHEET 5.

No. 790,519. PATENTED MAY 23, 1905.
J. MOLL & O. ZELLER.
APPARATUS FOR TURNING LOCOMOTIVE WHEELS AND THEIR ACCESSORIES
WHILE ASSEMBLED.
APPLICATION FILED JULY 12, 1902.

6 SHEETS—SHEET 6.

Witnesses:
Inventors:
Johann Moll
Otto Zeller
By Knight Bro
attys.

No. 790,519. Patented May 23, 1905.

UNITED STATES PATENT OFFICE.

JOHANN MOLL AND OTTO ZELLER, OF AUGSBURG, GERMANY.

APPARATUS FOR TURNING LOCOMOTIVE-WHEELS AND THEIR ACCESSORIES WHILE ASSEMBLED.

SPECIFICATION forming part of Letters Patent No. 790,519, dated May 23, 1905.

Application filed July 12, 1902. Serial No. 115,325.

*To all whom it may concern:*

Be it known that we, JOHANN MOLL and OTTO ZELLER, subjects of the King of Bavaria, residing at Augsburg, Germany, have invented certain new and useful Apparatus for Turning Locomotive-Wheels and Their Accessories While Assembled, of which the following is a specification.

The subject of the present invention is an apparatus for turning locomotive-wheels, &c., with their concentric and eccentric accessories, after they are completely assembled.

The apparatus is provided with two arrangements of operation, one of which causes the turning-ring, that is arranged in the ordinary way, to rotate around the work for the purpose of turning the parts concentric with the wheels, while the other causes the work itself to rotate for the purpose of treating it by means of the tools carried by the ring. The work remains thus during the whole working process in the fixed position after it once has been secured. In contradistinction to the lathes hitherto used, in which the parts concentric and eccentric with the wheels cannot both be prepared at the same time without refixing of the work, this machine has the essential advantage that it gives a hitherto-unobtainable exactness not only with regard to the parallelism of the geometrical axes of the various surfaces turned, but also respecting the rapidity of the working process, and especially respecting the exactness of the angular position of the various centers relatively to each other.

The application of this machine supersedes the old time-consuming and unsatisfactory process hitherto used, which consisted simply in providing the two locomotive-wheels with holes for the several pins and then finishing the pins, eccentrics, &c., in ordinary lathes and fitting and fixing them in place, whereby deviations of up to several millimeters in the various centers might occur.

Figure 9:
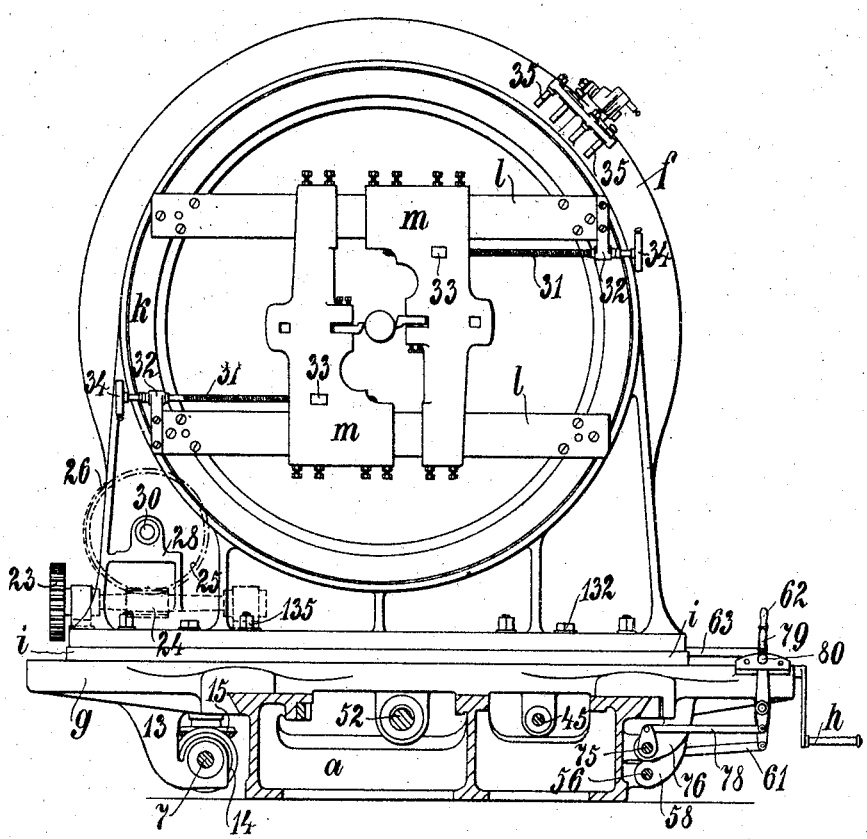
Figure 10:
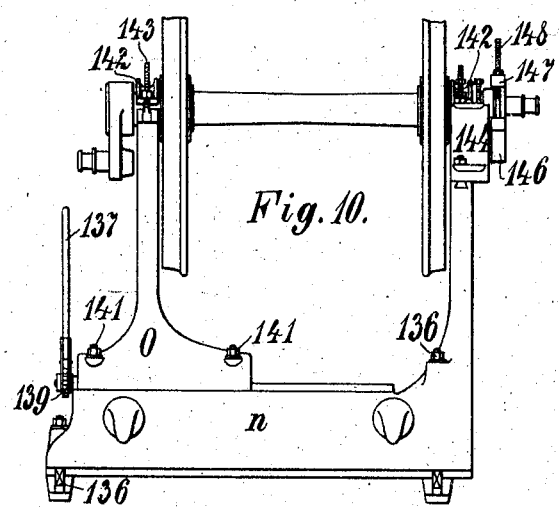
Figure 11:
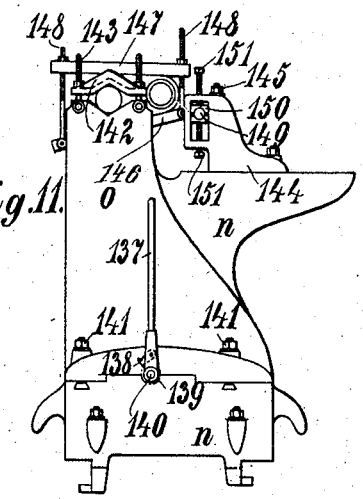
Figure 12:
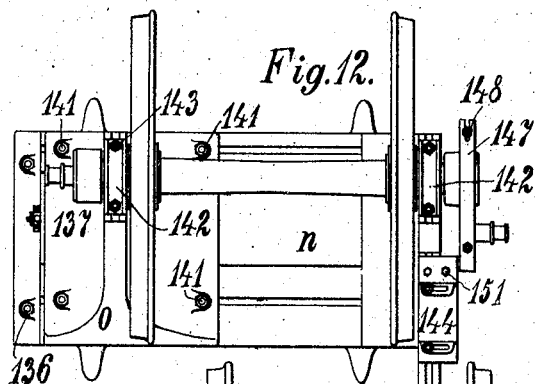
Figure 13:
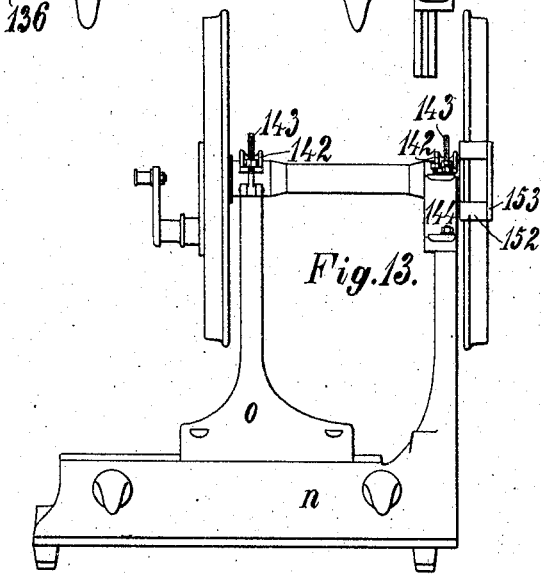
Figure 14:
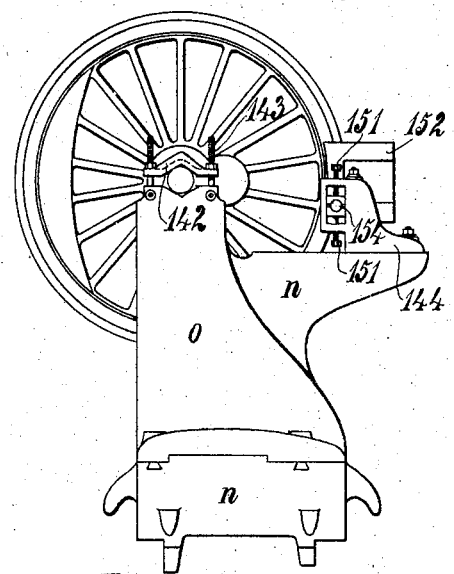

In the annexed drawings, Figure 1 is a side view of the turning-machine seen from the right. Figs. 2 and 3 are detail views showing groups of levers not sufficiently visible in Fig. 1. Fig. 4 is a side view seen from the left. Figs. 5 and 6 are detail views of certain levers observed in Fig. 4. Figs. 7 and 8 are respectively an elevation and a plan view of the entire turning-machine. Fig. 9 is a vertical cross-section on the line A of Fig. 7 seen from the left, and therefore forms a supplement to Fig. 4. Figs. 10, 11, and 12 are respectively an elevation, side view, and plan view, of the tool-holder or head-stock before referred to and shown in Figs. 13 and 14 in two methods of use.

In order to facilitate the explanation of the separate parts, the following description is arranged under separate heads.

*General arrangement of the turning-machine.*—On the left-hand end of the bed-plate $a$ the sliding puppet $b$, forming the main driving-gear, and an electromotor $c$ are stationarily fixed. On the right-hand end another sliding puppet, $e$, integral with its base $d$, is longitudinally slidable in the bed $a$, but adapted to be fixed in position by screws. Between the points of the two puppets $b$ and $e$ the work can be placed and the turning apparatus $f$ is arranged. The latter, which rests on a slide $g$, longitudinally movable on the bed $a$, can be moved slowly or quickly, as required, between the puppets $b$ and $e$ by means of mechanism hereinafter described. The underframe of the turning apparatus is also adapted to be given transverse adjustment, the slide $i$ being transversely movable on the longitudinally-movable slide $g$ by means of a worm or screw and crank-handle $h$. In the outer annular frame of the turning apparatus $f$ runs the turning-ring $k$, Figs. 8 and 9, to which are fixed the cross-bars $l$ for the two tool-supports $m$. When the turning apparatus $f$ has been adjusted on the slide $i$, these two parts are rigidly connected with each other, so as to form an integral whole. When the apparatus is removed from the machine, it is only done in connection with the slide.

As an example of work Figs. 1, 4, 7, and 8 illustrate a driving-axle for a locomotive, with inside cylinders journaled between the wheels, with cranks, eccentrics, and coupling-rod pins. On the double head-stock shown in Figs. 10, 11, and 12 an axle journaled outside the wheels, with overhung cranks and crank and coupling-rod pins, is shown. Figs.

13 and 14 show a double head-stock, with a locomotive-axle to be journaled between the wheels, with crank-pins formed on the wheels and counter-cranks.

*The driving of the turning apparatus.*—The electromotor c is screwed to the bed a and drives off a double broad pulley 2, connected to the loose and fast pulleys 3 4, which are placed on the shaft 5, together with the speed-pulley 6. A belt on the latter drives a speed-pulley 8, Figs. 4 and 8, loose on the main shaft 7. The pulley 8 is adapted to be coupled to the shaft 7 in the known manner by means of a clutch or the like, so that the said shaft can be rotated or put out of action. The main shaft extends along the entire length of the bed a, is journaled at 9, 10, 11, and 12, Fig. 8, and is longitudinally grooved between the two central bearings 10 and 11. Into the longitudinal groove (not shown in the drawings) engages a spline fixed in the known manner to the hub of a bevel-wheel 14, Fig. 9, which is mounted at 13, Fig. 8, on the slide g. The said spline transmits the rotary motion of the shaft 7 to the bevel-wheel 14 in all positions of the slide g. By means of the bevel-wheels 15, 16, and 17, Figs. 8 and 9, this motion is transmitted from the wheel 14 to the longitudinally-grooved shaft 20, journaled at 18 and 19. The bevel-wheel 17 is mounted on the bracket 21 of the slide g. By the toothed wheel 22, keyed to the shaft 20, rotation is transmitted to the toothed wheel 23, Fig. 4, the worm 24 and the worm-wheel 25, Figs. 8 and 9. The wheel 26 is integral with the wheel 25 and meshes with the toothed wheel 27, screwed to the ring k of the turning apparatus f. The wheels 25 and 26 are both keyed to the shaft 30, which is journaled at 28 and 29. The movement of the two toolholders m on the cross-bars l is effected by means of the two screws 31. The latter are journaled in bearings 32, fixed to the crossbars, and in nuts 33 and carry at their ends the heart-wheels 34, which are rotated either by hand or automatically by abutting against the pins 35, so that each time one of the heart-wheels 34 passes the pins 35 the turning apparatus in m receives an advance.

*Automatic slow displacement of the slide g.*—The slow displacement of the slide g in the longitudinal direction of the bed a, on which slide is mounted the cross-slide i with the turning apparatus f, can either be effected by hand, as will be hereinafter described under the heading "Hand displacement," or automatically by means of the following mechanism: At the right-hand end of the main shaft 7 is keyed the toothed wheel 35, Figs. 1 and 8, which meshes with a wheel 36, integral with the step-pulley 37. A driving-belt connects the latter with the step-pulley 39, integral with which is the toothed wheel 38, Fig. 8. The latter transmits its motion to the change-wheels 40 41 and to the wheels 42, 43, and 44. The wheel 44 is keyed to a shaft 45, which extends along the entire length of the machine, Fig. 8, and transmits the motion received at its right-hand end to the spindle 52 on the left, Figs. 1, 4, 5, 6, 8, which also extends along the entire length of the machine. The spindle 52 engages a nut fixed to the slide g and advances the latter when rotated.

The operation of the reversing-gear 38 40 41, by means of which the shaft 45 is caused to rotate to the right or to the left or to stop, is effected from the position of the turner in the following manner: The link or frame 53, which carries the wheels 40 41, is provided with a longitudinal slot 54, into which engages a pin fixed to the lever 55. The latter is keyed to the shaft 56, into the longitudinal groove of which engages the key of the lever 57, Figs. 2 and 7. The boss of the latter is pivoted in the bracket 58 on the under surface of the slide g, also Fig. 1, and therefore moves with the turning apparatus, whereby the said key in the lever-boss 57 moves on the shaft 56. The lever 59, Figs. 1, 2, 7, 8, which can be fixed in its three positions by means of the pin 60, transmits this motion through the connecting-rod 61 to the lever 57, the shaft 56, the lever 55, and the link 53, with the change-wheels 40 and 41. According to whether the lever 59 is fixed into the right-hand, left-hand, or central position, the wheel 40 or the wheels 41 and 42 will be engaged and the shaft 45 revolved to the right or the left or stopped. By the rotation of the said shaft to the right or the left the spindle 52 is rotated in the corresponding direction, and the slide g, with the turning apparatus f, is moved forward or backward.

*The hand displacement of the slide g.*—The above-described automatic movement of the turning apparatus placed on the slides g and i effects the regular advancing of the turning-tools toward the work, according to the ratio of the two trains of gear-wheels 35, 37, 39, and 44, and 46, 48, 50, and 51. If in a special case only a slight displacement is required for exactly adjusting the turning-tools, it is more convenient to use the following hand arrangement by means of the hand-lever 62: The shaft 45, before referred to, is longitudinally grooved at its central part, and into the groove engages a key fixed in the ratchet-wheel 65, Figs. 3, 8. By swinging over the pawl 66, which engages the ratchet-wheel 65 on the slide b, into its central position the connection between the lever 62 and ratchet-wheel 65, and thereby between the shaft 45, is broken. When, however, the wheels 40 and 41 have been disengaged from the wheel 42, the shaft 45 can be rotated to the right or left by means of the hand-lever 62, connecting-rod 63, the double lever 64, and the pawl 66, according to whether the pawl 66 is swung to one or the other side of the ratchet-wheel 65. The shaft 45 then transmits the motion to the spindle 52 in the manner already described, and thus displaces or advances the slide $g$.

*Rapid advancing of the slide $g$.*—For adjusting the turning apparatus for a certain working position rapid change of position is required in distinction from the slow method of displacement described under the two preceding heads. For this purpose a small gear-wheel 66, Figs. 4, 7, 8, is keyed to the shaft 5 and meshes with the pinion 68, carrying the pulley 67. A belt on the latter drives the pulley 70 with the pinion 69, and the latter transmits the motion by means of the reversing-wheels 71 72, Figs. 4, 6, 8, to the gear-wheel 47, Fig. 6, which is connected with the spindle 52 in the manner already described. The reversing-gear 69 71 72 is also operated from the operator's position.

The reversing-link 73, carrying the reversing-wheels 71 72, is provided with a longitudinal slot, into which engages a pin fixed to the lever 74. The latter is fixed to the shaft 75, into a longitudinal groove of which engages a key of the lever 77, pivoted at 76, Fig. 6. The pivot 76 is on the slide $g$. The lever 77 is connected to the hand-lever 79 by the connecting-rod 78. The lever 79 is fixed in its three positions by the pin 80. In the central position both the wheels 71 and 72 are disengaged from the wheel 47, whereas in either of the two end positions one of the said wheels 71 and 72 engages the wheel 47, and thus causes the slide $g$ to be moved forward or backward on the bed $a$. Before the engagement of this gear the wheel 46 is disengaged from the wheel 47.

*Belt-disengaging device of the motor.*—For the purpose of rapidly disconnecting and starting the machine the belt-fork 81 is provided, Figs. 4, 7, 8, and can be operated by means of the screw-spindle 82, which is adapted to be rotated by hand. The said screw-spindle 82 has bearings at 83 and 84, in which it is rotatable, but not displaceable, and the boss 85, which carries the two fork-arms 81, has cast on it a lug, which slides on the rod 86 when the screw-spindle 82 is rotated by means of the crank-handle 89 and chain and sprocket-wheel 87 88 and prevents the boss 85 from revolving. By this means the belt-fork 81 is moved in one or the other direction and the belt is thus placed on the loose or fast pulley 3 or 4.

As indicated in the introduction to this specification, it is at times necessary that instead of the cutting-tools rotating round the stationary work the reverse should take place—that is to say, the ring $k$, carrying the tools, must be stationary and the work must revolve therein. For this purpose the following arrangement is made: To allow of fixing the ring $k$ in such a manner that, on one hand, it will be exactly perpendicular to the shaft-axis and the like and, on the other hand, that vibration during the turning is impossible, it is prismatically fitted into the casing $f$ of the turning apparatus and the prism-ring can be firmly pressed against the guides of the casing, so that a uniform abutment of the whole ring against the casing-guides for its entire circumference is obtained and at the same time the rotation of the said ring is prevented. The adjustment-screws are uniformly distributed in the circumference of the toothed ring 27 and prevented by lock-nuts from becoming loose. The cone-pulley 8 on the main shaft 7, Figs. 4, 7, 8, is integral with a pulley 90 of double breadth, which is connected by a driving-belt to a loose and fast pulley 92 93. When the above-mentioned coupling of the pulley 8 with the main shaft 7 has been disengaged, the belt can be placed on the fast pulley 92. The shaft 91 is journaled in bearing 94 in brackets formed on the sliding puppet $b$ and by means of the bevel-gears 95 96 drives the worm-shaft 100, journaled at 97 98 99, and the worm-wheel 101, mounted on an extension of the sliding puppet $b$. The said worm-wheel 101 carries the wings 102 and 103, in slots of which are fixed the drivers 104 and 105, which drive the work. The movement of the slide in the longitudinal direction of the spindle 52 is in this case directly derived from the worm-shaft 100, which drives the worm-wheel 106, which is keyed, as well as the cone-pulley 107, to a shaft journaled at 108 109. The belt drives the pulley 110, which is located on the same shaft as is the gear-wheel 111. By means of the reversing-wheels 112 and 113 connection can be made with the gear-wheel 114, keyed to shaft 45. The spindle 52 is driven off the latter in the manner already described. For engaging and disengaging the reversing-gear the link 115, carrying the wheels 112 and 113, is connected by the rod 116 to the hand-lever 117, which latter can be fixed in either of its three positions by means of the pin 118. In the central position both the wheels 112 and 113 are out of gear with the wheel 114, whereas in the two end positions the wheels 112 and 113 respectively engage the wheel 114 and rotate the latter to the right or left. For transferring the belt to the loose or the fast pulley 92 or 93 the spindle 120, with the belt-forks 119, is moved longitudinally, for which purpose the right-hand end is screw-threaded and engages a beveled worm-wheel 121, Fig. 4. By means of a hand-wheel 123 and a bevel-wheel, both on the shaft 122, the wheel 121 can then be rotated and the spindle 120 thus displaced. The said spindle is prevented from rotating by a boss engaging the recess 124.

For adjusting the work the worm-shaft 100 is provided with a hand-wheel 125, and by means of the latter, the shaft, the worm-wheel 101, and the drivers 104 and 105 the work can be rotated into any desired angle. For preventing the work from rotating a frame 126, Fig. 7, is provided, to which can be attached, by means of the screws 128 and 129, the longitudinally-slotted wheel-holder 127. By means of the fixing-screws 130 and 131 the said wheel can be fixed and the work thus prevented from revolving.

For adjusting the turning apparatus $f$ (displacement in plane) the slide $i$, connected to the apparatus and prismatically guided on the slide $g$, carries, as already mentioned, a nut into which engages the worm or screw-spindle 134, having bearing at 133 in the slide $g$. By means of the crank-handle $h$, placed on a squared portion of the spindle 134, the apparatus $f$ can be moved on the slide $g$. It is, however, to be noted that during the turning the said apparatus must not be displaced, but must remain fixedly connected to the slide $g$ by means of the bolts 135.

*The supports or head-stocks.*—For turning the gudgeons and the like on the outside of the wheels the work is placed in the double support or head-stock $n$ $o$, Figs. 10 to 14, and when the sliding puppet $e$ and the turning apparatus $f$ have been moved to the right-hand end of the bed the said double support is placed between the sliding puppet $b$ and the apparatus $f$ on the bed $a$ and fixed thereto by the hook-screws 136. The support $o$ is movable in undercut guides on the support $n$ and can be moved by rotating the screw-spindle 140, which is journaled in said support $n$ and engages a nut on the other support, $o$. By means of the screws 141 the support $o$ can then be fastened to the support $n$. The work can be fastened to the double support $n$ and $o$ by means of the clamps 142 and screws 143. To prevent the work from rotating, a bracket 144 is movable on an arm cast on the support $n$ and adapted to be fixed on the said arm by means of the screws 145. The clamp-bars 146 and 147 are fixed, by means of the screws 148, to the crank-arm, and the pin 149, forged to the clamp-bar 146, is held in the bracket 144 by means of the cheeks 150 and screws 151, so that the work is prevented from revolving. In the other case—that is, when the wheel and not the crank must be held fast, Figs. 13 and 14—the wheel-rim is gripped between the plates 152 and 153, and the pin 154, forged to the plate 152, is held in the bracket by means of the cheeks 150 and screws 151, and in this manner the work is also prevented from rotating.

The action and method of using the double support are easily intelligible in view of what was said in the introduction to the specification. When the surfaces to be treated are between the wheels, the work is held between the points of the sliding puppets $b$ and $e$. If the said surfaces are outside the wheels, the double support $n$ $o$ is used. If the centers of the surfaces being turned are eccentric to the axis of the shaft, the work is stationary and the tool-holders $m$ receive the main and advancing movement. If, however, the said surfaces are concentric with the shaft-axis, the work rotates and the tool-holders alone receive the advancing movement.

We declare that what we claim is—

1. In a turning-machine of the class described, the combination of a bed, a slide on said bed adjustable longitudinally and transversely of the means for displacing the slide on the bed, a frame arranged on the slide, a ring rotatably arranged in said frame, a pair of parallel bars arranged across the ring, tool-holders adjustably arranged on said bars, a driving device adapted to rotate the ring and the tool-holders, and a second driving device adapted to rotate the work-piece in a direction opposite to the direction of rotation of the tool-holders.

2. In a turning device of the class described, the combination of a bed, a slide on said bed adjustable longitudinally and transversely of the means for displacing the slide on the bed, a frame arranged on the slide, a ring rotatably arranged in said frame, a pair of parallel bars arranged across the ring, tool-holders adjustably arranged on said bars, a driving device adapted to rotate the ring and the tool-holders, a second driving device adapted to rotate the work-piece in a direction opposite to the direction of rotation of the tool-holders, means for keeping the work-piece stationary while the tool-holders are rotated, and means for keeping the tool-holders stationary while the work-piece is rotated.

3. In a turning device of the class described, the combination of a bed, a slide on said bed adjustable longitudinally and transversely of the means for displacing the slide on the bed, a ring rotatably arranged in said frame, a pair of parallel bars arranged across the ring, tool-holders adjustably arranged on said bars, a driving device adapted to rotate the ring and the tool-holders, a double support for carrying and holding the work-piece, said support comprising two stocks adjustable relatively to each other and provided with means for holding the work, and a second driving device for rotating the work-piece in a direction opposite to the direction of rotation of the tool-holders.

The foregoing specification signed at Augsburg this 27th day of June, 1902.

JOHANN MOLL.
OTTO ZELLER.

In presence of—
FRED. GROSCH,
FRITZ SCHIESSEL.